United States Patent [19]
Ferriere

[11] Patent Number: 6,044,089
[45] Date of Patent: *Mar. 28, 2000

[54] SYSTEM AND METHOD FOR SCALEABLE AUDIO TRANSMISSION OVER A NETWORK

[75] Inventor: Philippe Ferriere, Redmond, Wash.

[73] Assignee: Microsoft Corporation, Redmond, Wash.

[*] Notice: This patent is subject to a terminal disclaimer.

[21] Appl. No.: 09/141,771

[22] Filed: Aug. 27, 1998

Related U.S. Application Data

[62] Division of application No. 08/540,818, Oct. 11, 1995.

[51] Int. Cl.[7] ......................................................... H04J 3/18
[52] U.S. Cl. ............................. 370/465; 370/521; 375/222
[58] Field of Search ..................................... 370/468, 465, 370/477, 472, 521; 375/222, 245; 704/500, 501, 503

[56] References Cited

U.S. PATENT DOCUMENTS

| | | | |
|---|---|---|---|
| 5,115,309 | 5/1992 | Hang | 370/477 |
| 5,241,535 | 8/1993 | Yoshikawa | 370/394 |
| 5,309,562 | 5/1994 | Li | 395/200.67 |
| 5,375,171 | 12/1994 | Dewolf et al. | 370/477 |
| 5,541,955 | 7/1996 | Jacobsmeyer | 375/222 |
| 5,617,423 | 4/1997 | Li et al. | 370/426 |
| 5,677,994 | 10/1997 | Miyamori et al. | 704/501 |
| 5,751,903 | 5/1998 | Swaminathan et al. | 704/230 |
| 5,835,495 | 11/1998 | Ferriere | 370/465 |

*Primary Examiner*—Min Jung
*Attorney, Agent, or Firm*—Lee & Hayes, PLLC

[57] ABSTRACT

An audio data transmission system encodes audio files into individual audio data blocks which contain a variable number bits of digital audio data that were sampled at a selectable sample rate. The number of bits of digital data and the input sampling rate are scaleable to produce an encoded bit stream bit rate that is less than or equal to an effective operational bit rate of a recipient's modem. The audio data transmission system uses computing units which are designed to select an appropriate combination of block size and input sampling rate to maximize the available bandwidth of the receiving modem. For example, if the modem connection speed for one modem is 14.4 kbps, a version of the audio data compressed at 13000 bits/s might be sent to the recipient; if the modem connection speed for another modem is 28.8 kbps, a version of the audio data compressed at 24255 bits/s might be sent to the receiver. The audio data blocks are then transmitted at the encoded bit stream bit rate to the intended recipient's modem. The audio data blocks are decoded at the recipient to reconstruct the audio file and immediately play the audio file as it is received. The audio data transmission system can be implemented in online service systems, ITV systems, computer data network systems, and communication systems.

11 Claims, 6 Drawing Sheets

SYSTEM AND METHOD FOR SCALEABLE AUDIO TRANSMISSION OVER A NETWORK

RELATED APPLICATIONS

This is a divisional of U.S. patent application Ser. No. 08/540,818, filed Oct. 11, 1995.

TECHNICAL FIELD

This invention relates to audio transmission over networks, such as cable-based and wireless networks used in telephony and computing systems.

BACKGROUND OF THE INVENTION

Digital audio data is transmitted over networks in many different settings. Telephone systems digitize voice and transmit digital voice data over telephone lines or cellular networks. Online service providers on the Internet can download audio files to computer users via conventional telephone or cable lines. Audio files can also be exchanged over traditional data networks, such as LANs (local area networks) and WANs (wide area networks), in a manner akin to electronic mail.

Current implementations of audio file transmission systems involve a transmission scheme in which the audio frames carrying the digital data are a fixed size. Present day modems operate at 9.6 kbps (kilobits per second), 14.4 kbps, and 28.8 kbps. The audio frames from an audio file are compressed at a bit rate for transmission over these various speed communication links. To ensure that transmission is possible over all three conventional speeds, the audio files are typically compressed at a bit rate of 8000 bits/second which can be sent to modems connected at 9.6 kbps, 14.4 kbps, and 28.8 kbps. While this rate will use most of the bandwidth available at 9.6 kbps, it uses only a fraction of the available bandwidth at 14.4 kbps and 28.8 kbps. Since the file is compressed at a lower quality rate of 8000 bits/second, the eventual reconstructed file has an equally low and fixed quality. The customers who use higher performing modems are penalized because they are unable to retrieve audio files of a quality commensurate with the performance of their systems.

It is therefore an aspect of this invention to provide an audio data transmission system which is scaleable to the communication link to use the maximum available bandwidth. In this way, a higher quality audio transmission can be provided to better performing modems.

In the online services setting, conventional systems require transmission of the entire audio file (whether compressed or uncompressed) before the recipient is able to play back the audio file. The audio file is at one fixed quality, such as that provided by the minimal compression rate of 8000 bits/second. For larger audio files carried over limited bandwidth channels (such as low-bandwidth telephone lines), the time required to download the whole audio file can take several minutes. This transmission delay is inconvenient to the recipient, particularly if the recipient is only browsing various audio files with little intent of listening to the entire audio file. The recipient is forced to request an audio file, await the slow transmission of the whole audio file at the minimal fixed bit rate, and then play it back.

Accordingly, it is another aspect of this invention to provide an optimal quality audio streaming in which the recipient can play the audio file as it is received.

SUMMARY OF THE INVENTION

This invention provides an audio file distribution system which permits optimal quality audio file streaming to individual customers with varying modem rates. The audio file distribution system has an audio server which configures the audio files into individual audio data blocks containing a variable number of bits of digital audio data that has been sampled at a selected input sampling rate. The number of bits of digital data and the input sampling rate are scaleable by the audio server to produce an encoded bit stream bit rate that is less than or equal to an effective operational bit rate of a recipient's modem. For example, if the modem connection speed is 14.4 kbps, a version of the audio data compressed at 13000 bits/s might be sent to the recipient; if the modem connection speed is 28.8 kbps, a version of the audio data compressed at 24255 bits/s might be sent to the receiver.

The audio data blocks are then transmitted at the encoded bit stream bit rate to the intended recipient's modem. A computing unit decodes the audio data blocks to reconstruct the audio file and immediately plays the audio file as each audio data block is received. There is no restriction of waiting for the entire audio file to be downloaded before playback. As a result, a customer can request an audio file from the audio server and begin listening immediately. If the customer is just browsing, he/she is free to cancel the audio file before the entire file is transmitted, making the audio file distribution process more efficient and user convenient.

To determine the appropriate block size of the audio data blocks, which enables scaleability to a recipient's effective modem connection speed, the audio server and recipient computing unit are equipped with an audio coder/decoder (or "codec"). The audio codec comprises a coder to encode digital samples representative of an audio input frame into a compressed format for transmission. The coder includes multiple quantizers for encoding the digital samples into the audio data blocks of various sizes, and a quantizer selector to select the appropriate one of the quantizers.

In the illustrated implementation, the coder is configured according to the European Group Speciale Mobile (GSM) standard. This coder has nine quantizers. Each quantizer encodes samples representative of an audio input frame consisting of 160 input audio samples into audio data blocks of a particular size associated with that quantizer. There are nine different block sizes, one for each corresponding quantizer. The block sizes differ according to a number of audio data bits contained in each audio data block. Moreover, each quantizer can be operated to encode the samples for three different input sampling rates. As a result, the coder can output 27 possible encoded bit stream bit rates from the available permutations of nine block sizes and three sampling rates.

The 27 possible encoded bit stream bit rates can be stored in lookup tables at the audio server and recipient computing units. The audio server selects the appropriate combination of block size and input sampling rate from the lookup table which maximizes the bandwidth of the receiving modem. The audio server then uses the selected sampling rate to generate audio samples and chooses the appropriate quantizer to encode those samples into the appropriate block size. The resulting encoded bit stream bit rate provides optimum quality for the receiving modem.

According to another aspect of this invention, a communication system involving multiple communication units and an interconnecting network is also adapted with an audio codec which facilitates scaleable and optimal audio quality real-time communication. An initiating communication unit supplies the effective bit rate of its associated modem to a responding communication unit. The responding communication unit then determines the smallest effective bit rate between the effective bit rates for the modems of the initiating and responding communication units, and sends the smallest effective bit rate back to the first communication unit. From that point on, the audio codecs select an appropriate quantizer which produces the audio data blocks with the quantity of bits and input sampling rate that yield an encoded bit stream bit rate of less than or equal to the smallest effective bit rate of the modems. The audio data blocks are then exchanged over the network at the encoded bit stream rate.

DETAILED DESCRIPTION OF THE PREFERRED EMBODIMENT

Figure 1:
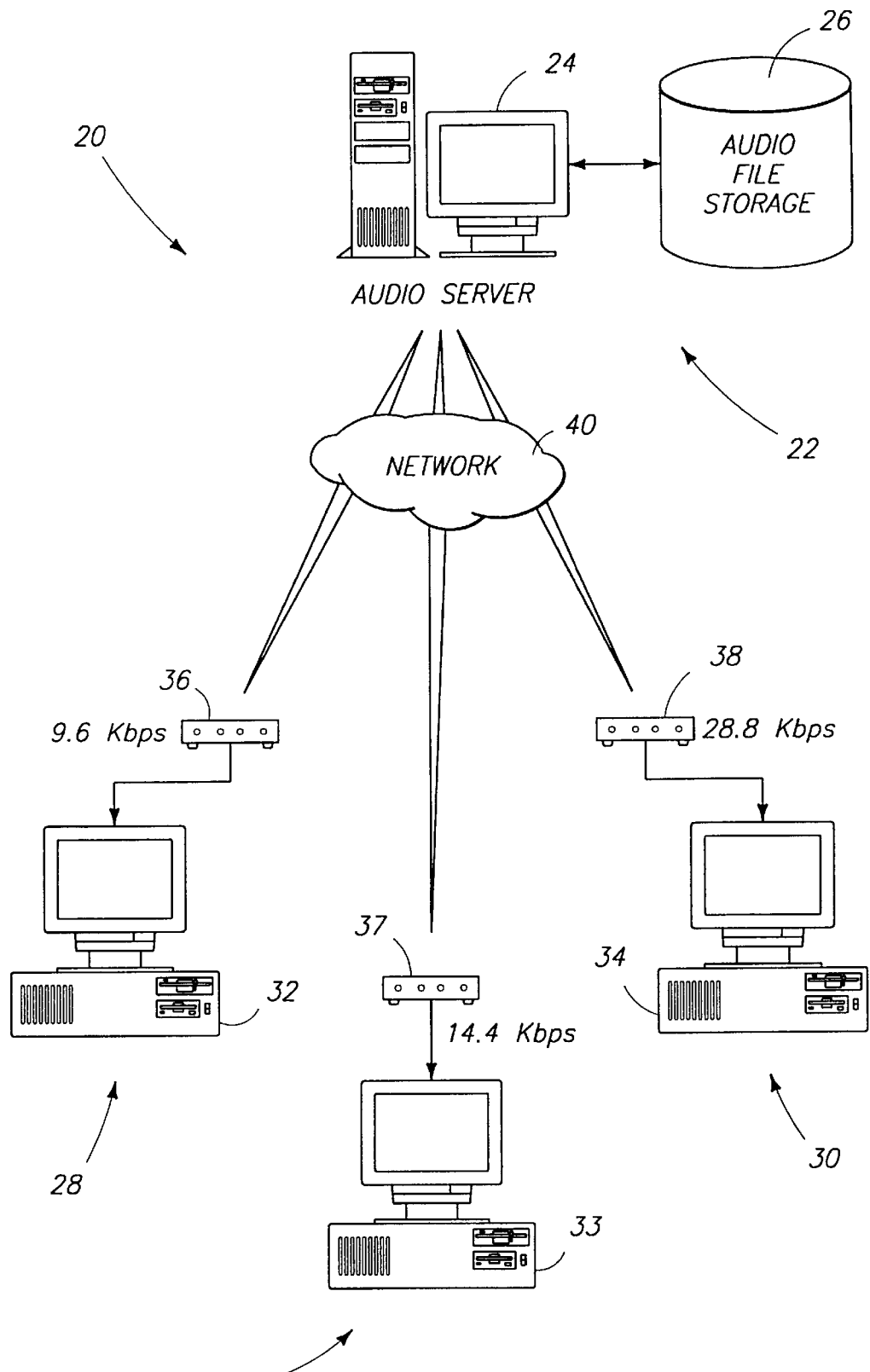
FIG. 1 is a diagrammatic illustration of an audio file distribution system according to one aspect of this invention.

FIG. 1 shows an audio file distribution system 20 for supplying digital audio files to multiple different participants. Audio file distribution system 20 has a headend 22 with an audio server 24 and an audio file storage 26. System 20 further includes multiple participants 28, 29, and 30 which use services provided by headend 22. Participants 28–30 are each equipped with a corresponding computing unit 32, 33, and 34 and corresponding modem 36, 37, and 38, respectively. The participant computing units are illustrated as desktop computers, but can alternatively be in implemented as other types of personal computers, telephone units, set-top boxes, or other digital processing mechanisms that are capable of handling digital audio data. The participant computing units 32–34 are interconnected to the audio server 24 via a network, represented by network cloud 40. The network 40 might be in the form of a wireless network, such as satellite and cellular phone networks, or a wire-based network, such as low-bandwidth telephone lines or higher-bandwidth cable networks.

As an example, the audio file distribution system 20 might be an online network system in which participants 28–30 dial up and request audio files from the headend 22. The audio server 24 retrieves the audio files from the storage 26 and downloads the audio files to the requesting computing units 32–34. As another example, the audio file distribution system 20 might be implemented as part of an interactive television (ITV) system in which subscribers 28–30 send requests over the TV cable to a cable headend for certain audio files for use in conjunction with, or separate from, video programs.

For discussion purposes, the modems 36–38 each operate at a different modem rate. The three most conventional modem rates are 9.6 kbps (kilobits per second), 14.4 kbps, and 28.8 kbps. Despite these different modem rates, however, the audio file distribution system 20 is capable of supplying the audio files at different bit rates which are appropriate for the receiving modem. More particularly, when requesting an audio file, the requesting computing unit transmits its present modem connection speed in terms of effective bit rate, which may be equal to or less than the modem rate. Suppose, for example, that computing unit 33 requests an audio file and its modem 37 is presently operating at an effective bit rate of 13.0 kbps. The computing unit 33 determines this effective bit rate by querying its operating system for the current connection speed of modem 37. The effective bit rate of 13.0 kbps is slightly less than the maximum modem rate of 14.4 kbps. This is not unusual. Often times two modems will negotiate to a slightly lower bit rate, and in cases of modem sharing, modem resources might be partly consumed by other activities thereby explaining a lower effective bit rate.

The computing unit 33 sends a request for an audio file and the effective bit rate of the modem 37 to the audio server 24. In return, the audio server 24 supplies a compressed version of the audio file over network 40 to computing unit 33 such that a bit stream bit rate of the compressed version is less than or equal to the effective bit rate of 13.0 kbps for modem 37. For instance, the audio server 24 might supply the compressed version at a bit rate of 12.955 kbps, 12.1 kbps, or 11.3 kbps.

Now suppose that computing unit 34 sends a request for the same audio file along with an effective bit rate of corresponding modem 38 which is, for example, 27.5 kpbs. In this case, the audio server 24 supplies a compressed version of the audio file over network 40 to computing unit 34 such that a bit stream bit rate of the compressed version is less than or equal to the effective bit rate of 27.5 kbps for modem 37. Here, the audio server 24 might supply the compressed version at a bit rate of 25.9 kbps, 22.6 kbps, or 15.4 kbps.

The audio server 24 thereby provides a compressed version of the requested audio file that is scaled to maximize the available bandwidth of the receiving modem. In the examples, the audio server 24 sent one compressed version of the audio file scaled to the speed of modem 37 (i.e., $\leq 13.0$ kbps) and sent a second compressed version of the same audio file scaled to the speed of modem 38 (i.e., $\leq 27.5$ kbps). The scaleability permits delivery of variable quality audio files that are commensurate with the communication bandwidth. The audio server 24 provides a higher quality version of the audio file to computing unit 34 (which has a higher performing modem) and a lower quality version to computing unit 33 (which has a lower performing modem).

The compressed audio file supplied from the audio server 24 consists of individual audio data blocks which contain a certain number bits of digital audio data produced at a selected sample rate. The audio data blocks have variable size depending upon the number of data bits included therein. The number of digital audio data bits and the sample rate are selected to provide an encoded bit stream bit rate that is less than or equal to the effective bit rate of the receiving modem.

Upon receipt of the audio data blocks representing the compressed audio file, the computing unit 33 decodes the audio data blocks and reproduces audio sound from the audio data blocks as they are received from the audio server. The computing unit does not wait for the entire file to be downloaded before decompressing the file; but instead plays the audio sound as the blocks are being received. The participant can thus begin listening to a requested audio file immediately, and cancel the file if he/she desires to quit listening to that file and move onto another file. Additionally, by scaleably encoding individual blocks, the receiving computing unit is ensured of optimal quality audio data.

A participant can also request multiple audio files from the audio server 24. In this case, the audio server 24 supplies a compressed version of each audio file over network 40 to the requesting computing unit. The bit stream bit rate of the compressed versions of each audio file is less than or equal to the effective bit rate of the receiving modem. Upon receipt of the compressed versions, the computing unit decompresses the audio data blocks, mixes the results, and plays the mixed version.

The audio server 24 and computing units 32-34 are all equipped with an audio coder/decoder (or "codes"). One suitable type of codec is a time-domain codec, and more particularly, an analysis-by-synthesis predictive codec. There are a variety of speech and other audio coding standards for different applications, both nationally and internationally. The standards are based upon different coding rates and employ different types of coders. The audio codecs are configured using one of the common standards, which includes versions of CCITT (International Telephone and Telegraph Consultative Committee), a European GSM (Group Speciale Mobile) standard, CTIA (Cellular Telecommunications Industry Association), and two U.S. federal standards. Table 1 lists various coding standards:

TABLE 1

| Standard | Rate (kbps) | Coder |
| --- | --- | --- |
| CCITT G.711 | 64 | log PCM |
| CCITT G.721 | 32 | ADPCM |
| CCITT G.723 | 24, 40 | ADPCM |
| CCITT G.727 | 16, 24, 32, 40 | Embedded ADPCM |
| CCITT G.728 | 16 | LD-CELP |
| GSM | 13 | RPE-LTP |
| CTIA | 8 | VSELP |
| Fed. Std. 1016 | 4.8 | CELP |
| Fed. Std. 1015 | 2.4 | LPC |

Figure 2:
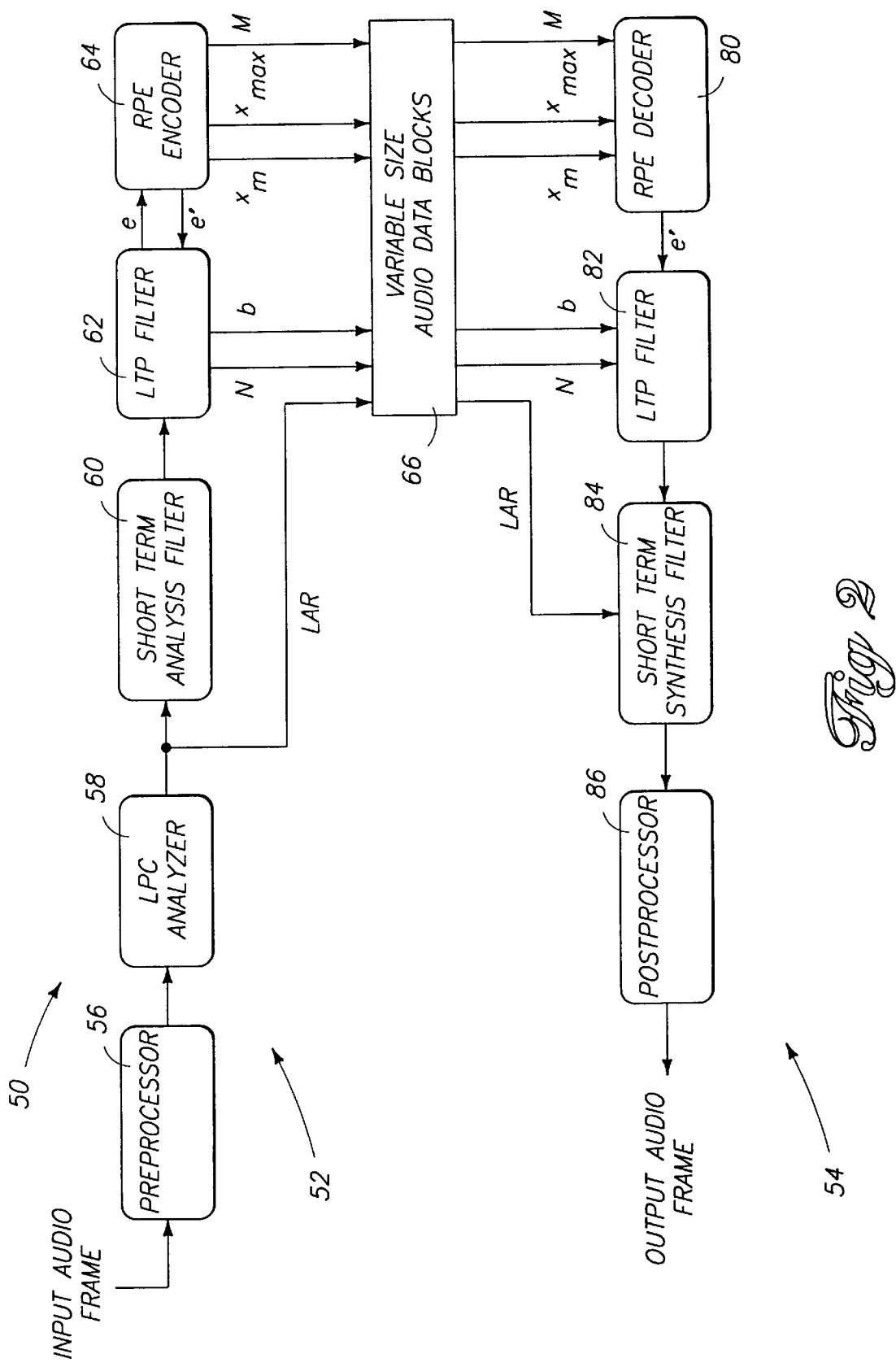
FIG. 2 is a block diagram of an audio coder/decoder (codec) according to another aspect of this invention. The audio codec is illustrated in an example implementation as an RPE-LTP codec according to the European GSM standard.

The various coders listed in Table 1 are as follows: PCM (pulse code modulation), ADPCM (adaptive differential PCM), LD-CELP (low delay code-excited linear prediction), RPE-LTP (regular pulse excitation—long-term predictor), VSELP (vector sum excited linear prediction), CELP (code-excited linear prediction), and LPC (linear predictive coding). FIG. 2 shows a block diagram of an audio codec 50 which is based in part on the European GSM standard, but modified to perform the encoding/decoding functions required by aspects of this invention. The audio codec 50 is preferably implemented in software which executes on the audio server and recipient computing units. The audio codec 50 encodes input audio frames of 160 audio samples (8-bit or 16-bit PCM format) into audio data blocks of various sizes and decodes the audio data blocks to reconstruct output audio frames of 160 audio samples. In the implementation described herein, the audio data blocks have nine different sizes of 164 bits, 176, bits, 188, bits, 200 bits, 212 bits, 224 bits, 236 bits, 248 bits, and 260 bits. The difference in block sizes are caused by differing numbers of encoded signal sample bits, whereby more bits results in higher quality and fewer bits results in lower quality. However, the omitted bits for the smaller block sizes are selected such that the quality loss is negligible and not too problematic to the human auditory system. The coding scheme is RPE-LTP (regular pulse excitation—long-term predictor).

The audio codec 50 includes an RPE-LTP coder 52 and an RPE-LTP decoder 54. The RPE-LTP coder 52 comprises a preprocessor 56, an LPC (linear predictive coding) analyzer 58, a short term analysis filter 60, a long term predictor filter 62, and an RPE encoder 64. The function of all RPE-LTP coder components other than the RPE encoder 64 are standard, and will not be described in detail. Rather, a summary of the functions are provided. A more detailed presentation of these components is described in the ETSI-GSM Technical Specification entitled "GSM Full Rate Speech Transcoding", GSM 06.10, Version 3.2.0, which is hereby incorporated by reference.

Preprocessor 56 receives an input audio frame consisting of 160 signal samples that are sampled at three different input sampling rates of 8000 samples/second, 11025 samples/second, and 22050 samples/second. For the 8000 Hz sampling rate, the 160 input samples represent 20 ms of audio. For the 11025 Hz sampling rate, the 160 input samples represent 14.5 ms of audio. Finally, for the 22050 Hz sampling rate, the 160 input samples represent 7.25 ms of audio. The preprocessor 56 produces an offset-free signal that is then subjected to a first order pre-emphasis filter, such as a FIR (Finite Impulse Response) filter.

The LPC analyzer 58 analyzes the 160 samples to determine coefficients for use in the short term analysis filter 60. The LPC analyzer 58 performs such tasks as segmentation of the audio frame, autocorrelation, calculation of reflection coefficients using the Schur recursion algorithm, transformation of the reflection coefficients into log area ratios LARs, and quantization and coding of the LARs. The short term analysis filter 60 filters the same 160 samples to produce a short term residual signal. The short term analysis filter 60 performs such tasks as decoding the LARs from the LPC analyzer 58, interpolating the decoded LARs to avoid spurious transients which may occur if the filter coefficients are changed abruptly, transforming the LARs into reflection coefficients, and short term analysis filtering.

The audio frame is divided into four sub-frames, with each sub-frame having forty samples of the short term residual signal. The sub-frames are processed blockwise by the long term predictor filter 62 and RPE encoder 64. Each sub-frame is initially passed to the long term predictor (LTP) filter 62. Before processing the sub-frame, LTP parameters used in the LTP filter 62 are estimated and updated using the current sub-frame and a stored sequence of the 120 previous reconstructed short term residual samples. These LTP parameters include LTP lags N and LTP gains b.

A segment of forty long term residual signal samples is obtained by subtracting forty estimates of the short term residual signal from the short term residual signal itself. The resulting segment of forty long term residual samples, designated as "e," is fed to the RPE encoder 64 for compression. The RPE encoder 64 encodes the long term residual samples into a compressed format for transmission. The compressed format contains the RPE parameters which include signal samples $x_m$, a maximum of the samples $x_{max}$, and a grid position M, as will be described in more detail below.

The RPE encoder 64 also produces a segment of forty samples of the quantized version of a reconstructed long term residual signal, designated as "e'," and sends the samples back to the LTP filter 62. The forty quantized samples of the long term residual are added to the previous sub-frame of forty short term residual signal estimates to produce a reconstructed version of the current short term residual signal. This sub-frame of reconstructed short term residual signal samples is then fed back to produce a new sub-frame of forty short term residual signal estimates, thereby completing a feedback loop used in predictive coders of this type.

The RPE parameters ($x_m$, $x_{max}$, M) and LTP parameters (N, b) for all four sub-frames, along with the filter parameters (LARs), are configured into audio data blocks 66 of various sizes. These audio data blocks are then transmitted to the RPE-LTP decoder 54.

Figure 3:
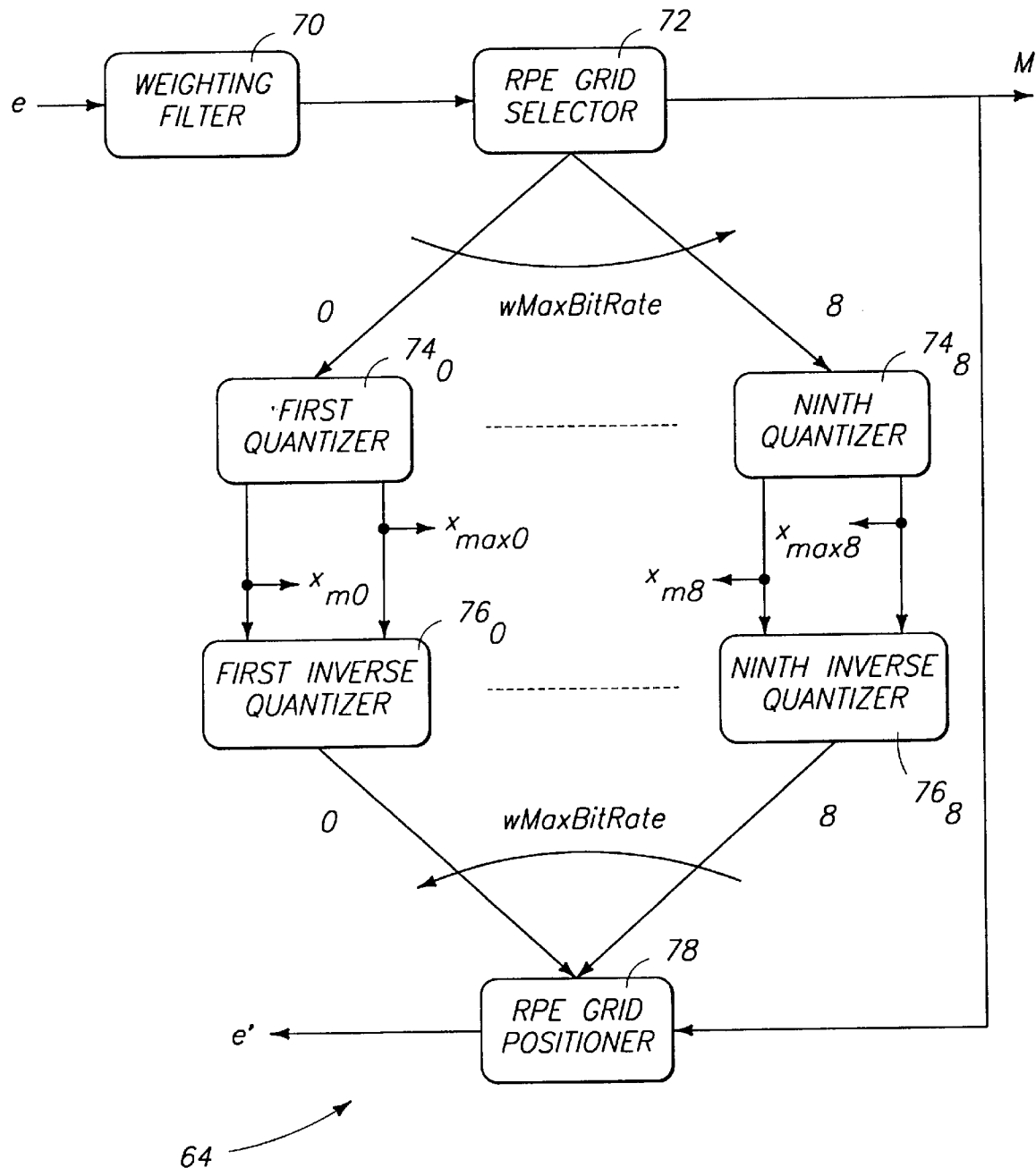
FIG. 3 is a block diagram of an RPE encoder employed in the FIG. 2 codec.

FIG. 3 shows a block diagram of the RPE encoder 64 in more detail. RPE encoder 64 has a weighting filter 70, an RPE grid selector 72, nine quantizers $74_0$–$74_8$, nine corresponding inverse quantizers $76_0$–$76_8$, and an RPE grid positioner 78. The weighting filter 70 is a FIR filter that is applied to each sub-frame by convolving the forty long term residual samples e with an 11-tap impulse response. One suitable impulse response is provided in the above-referenced and incorporated ETSI-GSM Technical Specification. This filtering process yields a filtered signal x.

The RPE grid selector 72 down-samples the filtered signal x by a ratio of three to yield three interleaved sequences consisting of 14, 13, and 13 samples. The RPE grid selector then splits these sequences into four sub-sequences $x_m$, where "m" denotes the position of a decimation grid. Each sub-sequence $x_m$ has thirteen RPE samples. The RPE grid selector 72 selects an optimum sub-sequence $x_M$ which has the maximum energy from among the four sub-sequences, where "M" denotes the optimum grid position.

One of the quantizers $74_0$–$74_8$ encodes the sub-sequence of RPE samples into a compressed format for transmission. More particularly, the selected sub-sequence $x_M(i)$ of thirteen RPE samples is quantized by one of the quantizers $74_0$–$74_8$ using APCM (Adaptive Pulse Code Modulation). To perform the quantization, a maximum $x_{max}$ of the absolute value $|x_M(i)|$ is selected for each sub-sequence of thirteen samples $x_M(i)$. The maximum $x_{max}$ is quantized logarithmically and output as one of the RPE parameters in the audio data block 66. The thirteen RPE samples of the selected sub-sequence $x_M(i)$ are then normalized by a decoded version $x'_{max}$ of the block maximum, as follows:

$$x'(i) = x_M(i)/x'_{max}; i=0, \ldots, 12$$

The normalized samples x'(i) are quantized uniformly with one of the nine quantizers $74_0$–$74_8$. The appropriate quantizer is selected by the RPE grid selector 72 depending upon the best available effective bit rate wMaxBitRate at which the receiving modem is presently operating. In this manner, the RPE grid selector also functions as a quantizer selector. The effective bit rate wMaxBitRate of the receiving mode is known by the RPE encoder prior to the quantization process. In the system of FIG. 1, for example, the participant computing units queried the operating system for the present modem connection speed and forwarded this effective bit rate wMaxBitRate to the audio server.

Depending upon which quantizer is selected, the audio data blocks output by the RPE-LTP coder 52 are different in size. The audio data blocks have nine different sizes of 164 bits, 176, bits, 188, bits, 200 bits, 212 bits, 224 bits, 236 bits, 248 bits, and 260 bits depending upon which quantizer is selected. The various sized audio data blocks differ in the number of bits used to represent the thirteen normalized RPE samples for each of the four sub-frames. The smaller audio data blocks (i.e., 164-bit and 176-bit) contain fewer bits to represent the normalized RPE samples, whereas the larger audio data blocks (i.e., 248-bit and 260-bit) contain more bits to represent the normalized RPE samples. The fewer the bits results in a slightly lower quality signal, but not to an annoying or disruptive level.

When the effective bit rate of the receiving modem is comparatively smaller, representing a lower performing modem, a quantizer that causes output of smaller sized audio data blocks is selected. The lower quality signal is commensurate with the performance of the receiving modem. Conversely, when the effective bit rate of the receiving modem is comparatively higher, representing a better performing modem, a quantizer that causes output of larger sized audio data blocks is selected. The higher quality signal is commensurate with the performance of the better performing receiving modem. In this manner, the multiple quantizers enable the RPE-LTP coder 52 to be scaleable according to the awaiting modem capabilities.

The following discussion provides a specific example implementation of the nine quantizers used in an audio RPE-LTP coder that is implemented according to the European GSM standard. The first quantizer $74_0$ is selected when the wMaxBitRate is at a level 0. The first quantizer $74_0$ uniformly quantizes the first eight normalized samples x'(i) of the first sub-frame to two bits, the last five normalized samples x'(i) of the first sub-frame to one bit, and the thirteen normalized samples x'(i) of the three last sub-frames to one bit. Upon selection of the first quantizer, the RPE-LTP coder 52 will output a 164-bit audio data block having the bit allocation shown in Table 2.

TABLE 2

| wMaxBitRate == 0 Parameter | Parameter name | Variable Name | Number of bits |
|---|---|---|---|
| Filter parameters | 8 LARs | LAR1–LAR8 | 36 |
| Sub-frame #1 parameters | 1 LTP lag | N1 | 7 |
| | 1 LTP gain | b1 | 2 |
| | 1 RPE grid position | M1 | 2 |
| | 1 Block amplitude | $x_{max1}$ | 6 |
| | 13 RPE samples | x1(0)–x1(12) | 21 |
| Sub-frame #2 parameters | 1 LTP lag | N2 | 7 |
| | 1 LTP gain | b2 | 2 |
| | 1 RPE grid position | M2 | 2 |
| | 1 Block amplitude | $x_{max2}$ | 6 |
| | 13 RPE samples | x2(0)–x2(12) | 13 |
| Sub-frame #3 parameters | 1 LTP lag | N3 | 7 |
| | 1 LTP gain | b3 | 2 |
| | 1 RPE grid position | M3 | 2 |
| | 1 Block amplitude | $X_{max3}$ | 6 |
| | 13 RPE samples | x3(0)–x3(12) | 13 |
| Sub-frame #4 parameters | 1 LTP lag | N4 | 7 |
| | 1 LTP gain | b4 | 2 |
| | 1 RPE grid position | M4 | 2 |
| | 1 Block amplitude | $X_{max4}$ | 6 |
| | 13 RPE samples | x4(0)–x4(12) | 13 |
| | | Total | 164 |

The second quantizer $74_1$ is selected when the wMaxBitRate is at a level 1. The second quantizer $74_1$ uniformly quantizes the thirteen normalized samples x'(i) of the first sub-frame to two bits, the first seven normalized samples x'(i) of the second sub-frame to two bits, the last six normalized samples x'(i) of the second sub-frame to one bit, and the thirteen normalized samples x'(i) of the two last sub-frames to one bit. Upon selection of the second quantizer, the RPE-LTP coder 52 will output a 176-bit audio data block having the bit allocation shown in Table 3.

TABLE 3

| wMaxBitRate == 1 Parameter | Parameter name | Variable Name | Number of bits |
|---|---|---|---|
| Filter parameters | 8 Log. Area ratios | LAR1–LAR8 | 36 |
| Sub-frame #1 parameters | 1 LTP lag | N1 | 7 |
| | 1 LTP gain | b1 | 2 |
| | 1 RPE grid position | M1 | 2 |
| | 1 Block amplitude | $x_{max1}$ | 6 |
| | 13 RPE samples | x1(0)–x1(12) | 26 |
| Sub-frame #2 parameters | 1 LTP lag | N2 | 7 |
| | 1 LTP gain | b2 | 2 |
| | 1 RPE grid position | M2 | 2 |
| | 1 Block amplitude | $x_{max2}$ | 6 |
| | 13 RPE samples | x2(0)–x2(12) | 20 |
| Sub-frame #3 parameters | 1 LTP lag | N3 | 7 |
| | 1 LTP gain | b3 | 2 |
| | 1 RPE grid position | M3 | 2 |
| | 1 Block amplitude | $x_{max3}$ | 6 |
| | 13 RPE samples | x3(0)–x3(12) | 13 |
| Sub-frame #4 parameters | 1 LTP lag | N4 | 7 |
| | 1 LTP gain | b4 | 2 |
| | 1 RPE grid position | M4 | 2 |
| | 1 Block amplitude | $x_{max4}$ | 6 |
| | 13 RPE samples | x4(0)–x4(12) | 13 |
| | | Total | 176 |

The third quantizer $74_2$ is selected when the wMaxitrate is at a level 2. The third quantizer $74_2$ uniformly quantizes the thirteen normalized samples x'(i) of the first two sub-frames to two bits, the first six normalized samples x'(i) of the third sub-frame to 2 bits, the last seven normalized samples x'(i) of the third sub-frame to one bit, and the thirteen normalized samples x'(i) of the last sub-frame to one bit. Upon selection of the third quantizer, the RPE-LTP coder 52 will output a 188-bit audio data block having the bit allocation shown in Table 4.

TABLE 4

| wMaxBitRate == 2 Parameter | Parameter name | Variable Name | Number of bits |
|---|---|---|---|
| Filter parameters | 8 Log. Area ratios | LAR1–LAR8 | 36 |
| Sub-frame #1 parameters | 1 LTP lag | N1 | 7 |
| | 1 LTP gain | b1 | 2 |
| | 1 RPE grid position | M1 | 2 |
| | 1 Block amplitude | $x_{max1}$ | 6 |
| | 13 RPE samples | x1(0)–x1(12) | 26 |
| Sub-frame #2 parameters | 1 LTP lag | N2 | 7 |
| | 1 LTP gain | b2 | 2 |
| | 1 RPB grid position | M2 | 2 |
| | 1 Block amplitude | $x_{max2}$ | 6 |
| | 13 RPE samples | x2(0)–x2(12) | 26 |
| Sub-frame #3 parameters | 1 LTP lag | N3 | 7 |
| | 1 LTP gain | b3 | 2 |
| | 1 RPB grid position | M3 | 2 |
| | 1 Block amplitude | $x_{max3}$ | 6 |
| | 13 RPE samples | x3(0)–x3(12) | 19 |
| Sub-frame #4 parameters | 1 LTP lag | N4 | 7 |
| | 1 LTP gain | b4 | 2 |
| | 1 RPE grid position | M4 | 2 |
| | 1 Block amplitude | $x_{max4}$ | 6 |
| | 13 RPB samples | x4(0)–x4(12) | 13 |
| | | Total | 188 |

The fourth quantizer $74_3$ is selected when the wMaxBitRate is at a level 3. The fourth quantizer $74_3$ uniformly quantizes the thirteen normalized samples x'(i) of the first three sub-frames to two bits, the first five normalized samples x'(i) of the last sub-frame to two bits, and the last eight normalized samples x'(i) of the last sub-frame to one bit. Upon selection of the fourth quantizer, the RPE-LTP coder 52 will output a 200-bit audio data block having the bit allocation shown in Table 5.

TABLE 5

| wMaxBitRate == 3 Parameter | Parameter name | Variable Name | Number of bits |
|---|---|---|---|
| Filter parameters | 8 Log. Area ratios | LAR1–LAR8 | 36 |
| Sub-frame #1 parameters | 1 LTP lag | N1 | 7 |
| | 1 LTP gain | b1 | 2 |
| | 1 RPB grid position | M1 | 2 |
| | 1 Block amplitude | $x_{max1}$ | 6 |
| | 13 RPE samples | x1(0)–x1(12) | 26 |
| Sub-frame #2 parameters | 1 LTP lag | N2 | 7 |
| | 1 LTP gain | b2 | 2 |
| | 1 RPE grid position | M2 | 2 |
| | 1 Block amplitude | $x_{max2}$ | 6 |
| | 13 RPE samples | x2(0)–x2(12) | 26 |
| Sub-frame #3 parameters | 1 LTP lag | N3 | 7 |
| | 1 LTP gain | b3 | 2 |
| | 1 RPE grid position | M3 | 2 |
| | 1 Block amplitude | $x_{max3}$ | 6 |
| | 13 RPE samples | x3(0)–x3(12) | 26 |
| Sub-frame #4 parameters | 1 LTP lag | N4 | 7 |
| | 1 LTP gain | b4 | 2 |
| | 1 RPE grid position | M4 | 2 |
| | 1 Block amplitude | $x_{max4}$ | 6 |
| | 13 RPE samples | x4(0)–x4(12) | 18 |
| | | Total | 200 |

The fifth quantizer $74_4$ is selected when the wMaxBitRate is at a level 4. The fifth quantizer $74_4$ uniformly quantizes the first four normalized samples x'(i) of the first sub-frame to three bits, the last nine normalized samples x'(i) of the first sub-frame to two bits, and the thirteen normalized samples x'(i) of the last three sub-frames to two bits. Upon selection of the fifth quantizer, the RPE-LTP coder 52 will output a 212-bit audio data block having the bit allocation shown in Table 6.

TABLE 6

| wMaxBitRate == 4 Parameter | Parameter name | Variable Name | Number of bits |
|---|---|---|---|
| Filter parameters | 8 Log. Area ratios | LAR1–LAR8 | 36 |
| Sub-frame #1 parameters | 1 LTP lag | N1 | 7 |
| | 1 LTP gain | b1 | 2 |
| | 1 RPE grid position | M1 | 2 |
| | 1 Block amplitude | $x_{max1}$ | 6 |
| | 13 RPE samples | x1(0)–x1(12) | 30 |
| Sub-frame #2 parameters | 1 LTP lag | N2 | 7 |
| | 1 LTP gain | b2 | 2 |
| | 1 RPB grid position | M2 | 2 |
| | 1 Block amplitude | $x_{max2}$ | 6 |
| | 13 RPB samples | x2(0)–x2(12) | 26 |
| Sub-frame #3 parameters | 1 LTP lag | N3 | 7 |
| | 1 LTP gain | b3 | 2 |
| | 1 RPE grid position | M3 | 2 |
| | 1 Block amplitude | $x_{max3}$ | 6 |
| | 13 RPE samples | x3(0)–x3(12) | 26 |
| Sub-frame #4 parameters | 1 LTP lag | N4 | 7 |
| | 1 LTP gain | b4 | 2 |
| | 1 RPE grid position | M4 | 2 |
| | 1 Block amplitude | $x_{max4}$ | 6 |
| | 13 RPE samples | x4(0)–x4(12) | 26 |
| | | Total | 212 |

The sixth quantizer $74_5$ is selected when the wMaxBitRate is at a level 5. The sixth quantizer $74_5$ uniformly quantizes the thirteen normalized samples x'(i) of the first sub-frame to three bits, the first three normalized samples x'(i) of the second sub-frame to three bits, the last ten normalized samples x'(i) of the second sub-frame to two bits, and the thirteen normalized samples x'(i) of the last two frames to two bits. Upon selection of the sixth quantizer, the RPE-LTP coder 52 will output a 224-bit audio data block having the bit allocation shown in Table 7.

TABLE 7

| wMaxBitRate == 5 Parameter | Parameter name | Variable Name | Number of bits |
|---|---|---|---|
| Filter parameters | 8 Log. Area ratios | LAR1–LAR8 | 36 |
| Sub-frame #1 parameters | 1 LTP lag | N1 | 7 |
|  | 1 LTP gain | b1 | 2 |
|  | 1 RPE grid position | M1 | 2 |
|  | 1 Block amplitude | $x_{max1}$ | 6 |
|  | 13 RPE samples | x1(0)–x1(12) | 39 |
| Sub-frame #2 parameters | 1 LTP lag | N2 | 7 |
|  | 1 LTP gain | b2 | 2 |
|  | 1 RPE grid position | M2 | 2 |
|  | 1 Block amplitude | $x_{max2}$ | 6 |
|  | 13 RPE samples | x2(0)–x2(12) | 29 |
| Sub-frame #3 parameters | 1 LTP lag | N3 | 7 |
|  | 1 LTP gain | b3 | 2 |
|  | 1 RPE grid position | M3 | 2 |
|  | 1 Block amplitude | $x_{max3}$ | 6 |
|  | 13 RPE samples | x3(0)–x3(12) | 26 |
| Sub-frame #4 parameters | 1 LTP lag | N4 | 7 |
|  | 1 LTP gain | b4 | 2 |
|  | 1 RPE grid position | M4 | 2 |
|  | 1 Block amplitude | $x_{max4}$ | 6 |
|  | 13 RPE samples | x4(0)–x4(12) | 26 |
|  |  | Total | 224 |

The seventh quantizer $74_6$ is selected when the wNMaxBitRate is at a level 6. The seventh quantizer $74_6$ uniformly quantizes the thirteen normalized samples x'(i) of the first two sub-frames to three bits, the first two normalized samples x'(i) of the third sub-frame to three bits, the last eleven normalized samples x'(i) of the third sub-frame to two bits, and the thirteen normalized samples x'(i) of the fourth sub-frame to two bits. Upon selection of the seventh quantizer, the RPE-LTP coder 52 will output a 236-bit audio data block having the bit allocation shown in Table 8.

TABLE 8

| wMaxBitRate == 6 Parameter | Parameter name | Variable Name | Number of bits |
|---|---|---|---|
| Filter parameters | 8 Log. Area ratios | LAR1–LAR8 | 36 |
| Sub-frame #1 parameters | 1 LTP lag | N1 | 7 |
|  | 1 LTP gain | b1 | 2 |
|  | 1 RPE grid position | M1 | 2 |
|  | 1 Block amplitude | $x_{max1}$ | 6 |
|  | 13 RPE samples | x1(0)–x1(12) | 39 |
| Sub-frame #2 parameters | 1 LTP lag | N2 | 7 |
|  | 1 LTP gain | b2 | 2 |
|  | 1 RPE grid position | M2 | 2 |
|  | 1 Block amplitude | $x_{max2}$ | 6 |
|  | 13 RPE samples | x2(0)–x2(12) | 39 |
| Sub-frame #3 parameters | 1 LTP lag | N3 | 7 |
|  | 1 LTP gain | b3 | 2 |
|  | 1 RPE grid position | M3 | 2 |
|  | 1 Block amplitude | $x_{max3}$ | 6 |
|  | 13 RPE samples | x3(0)–x3(12) | 23 |
| Sub-frame #4 parameters | 1 LTP lag | N4 | 7 |
|  | 1 LTP gain | b4 | 2 |
|  | 1 RPE grid position | M4 | 2 |
|  | 1 Block amplitude | $x_{max4}$ | 6 |
|  | 13 RPE samples | x4(0)–x4(12) | 26 |
|  |  | Total | 236 |

The eighth quantizer $74_7$ is selected when the wMaxBitRate is at a level 7. The eighth quantizer $74_7$ quantizes the thirteen normalized samples x'(i) of the first three sub-frames to three bits, the first normalized sample x'(i) of the fourth sub-frame to three bits, the last twelve normalized samples x'(i) of the fourth sub-frame to two bits. Upon selection of the eighth quantizer, the RPE-LTP coder 52 will output a 248-bit audio data block having the bit allocation shown in Table 9.

TABLE 9

| wMaxBitRate == 7 Parameter | Parameter name | Variable Name | Number of bits |
|---|---|---|---|
| Filter parameters | 8 Log. Area ratios | LAR1–LAR8 | 36 |
| Sub-frame #1 parameters | 1 LTP lag | N1 | 7 |
|  | 1 LTP gain | b1 | 2 |
|  | 1 RPE grid position | M1 | 2 |
|  | 1 Block amplitude | $x_{max1}$ | 6 |
|  | 13 RPE samples | x1(0)–x1(12) | 39 |
| Sub-frame #2 parameters | 1 LTP lag | N2 | 7 |
|  | 1 LTP gain | b2 | 2 |
|  | 1 RPE grid position | M2 | 2 |
|  | 1 Block amplitude | $x_{max2}$ | 6 |
|  | 13 RPE samples | x2(0)–x2(12) | 39 |
| Sub-frame #3 parameters | 1 LTP lag | N3 | 7 |
|  | 1 LTP gain | b3 | 2 |
|  | 1 RPE grid position | M3 | 2 |
|  | 1 Block amplitude | $x_{max3}$ | 6 |
|  | 13 RPE samples | x3(0)–x3(12) | 39 |
| Sub-frame #4 parameters | 1 LTP lag | N4 | 7 |
|  | 1 LTP gain | b4 | 2 |
|  | 1 RPE grid position | M4 | 2 |
|  | 1 Block amplitude | $x_{max4}$ | 6 |
|  | 13 RPE samples | x4(0)–x4(12) | 27 |
|  |  | Total | 248 |

The ninth quantizer $74_8$ is selected when the wMaxBitRate is at a level 8. The ninth quantizer $74_8$ quantizes the thirteen normalized samples x'(i) to three bits. Upon selection of the ninth quantizer, the RPE-LTP coder 52 will output a 260-bit audio data block having the bit allocation shown in Table 10.

TABLE 10

| wMaxBitRate == 8 Parameter | Parameter name | Variable Name | Number of bits |
|---|---|---|---|
| Filter parameters | 8 Log. Area ratios | LAR1–LAR8 | 36 |
| Sub-frame #1 parameters | 1 LTP lag | N1 | 7 |
|  | 1 LTP gain | b1 | 2 |
|  | 1 RPE grid position | M1 | 2 |
|  | 1 Block amplitude | $x_{max1}$ | 6 |
|  | 13 RPE samples | x1(0)–x1(12) | 39 |
| Sub-frame #2 parameters | 1 LTP lag | N2 | 7 |
|  | 1 LTP gain | b2 | 2 |
|  | 1 RPE grid position | M2 | 2 |
|  | 1 Block amplitude | $x_{max2}$ | 6 |
|  | 13 RPE samples | x2(0)–x2(12) | 39 |
| Sub-frame #3 parameters | 1 LTP lag | N3 | 7 |
|  | 1 LTP gain | b3 | 2 |
|  | 1 RPE grid position | M3 | 2 |
|  | 1 Block amplitude | $x_{max3}$ | 6 |
|  | 13 RPE samples | x3(0)–x3(12) | 39 |
| Sub-frame #4 parameters | 1 LTP lag | N4 | 7 |
|  | 1 LTP gain | b4 | 2 |
|  | 1 RPE grid position | M4 | 2 |
|  | 1 Block amplitude | $x_{max4}$ | 6 |
|  | 13 RPE samples | x4(0)–x4(12) | 39 |
|  |  | Total | 260 |

The nine quantizers $74_0$–$74_8$ can be operated to encode the RPE samples for multiple different input sampling rates. As explained above, there are three input sampling rates in this example implementation: 8000 samples/second, 11025 samples/second, and 22050 samples/second. The appropriate input sampling rate is also determined according to the effective bit rate of the receiving modem. When the effective bit rate of the receiving modem is comparatively smaller, representing a lower performing modem, the selected one of nine quantizers is operated at the lower sample rate to produce a lower quality signal that is commensurate with the performance of the receiving modem. Conversely, when the effective bit rate of the receiving modem is comparatively higher, representing a better performing modem, the selected quantizer is operated at the higher sample rate to produce a higher quality signal that is commensurate with the performance of the receiving modem.

The RPE-LTP coder is therefore scaleable to output the encoded data stream at different bit rates depending upon the effective bit rate of the receiving modem. In this example, there are twenty-seven combinations of block size and input sampling rate. The different bit rates are determined from any combination of the set of nine available block sizes and set of three available input sampling rates. More particularly, the encoded bit stream bit rate EBSBR is determined as follows:

EBSBR (Block Size×Input Sampling Rate)/Samples in Input Frame

In this example, the input audio data was configured in frames of 160 samples. Based on the 160 sample input frames, the twenty-seven possible bit rates for the corresponding combinations of block size and input sampling rate are provided in Table 11.

TABLE 11

| Encoded Block Size (bits) | Input Sampling Rate (samples/s) | Encoded Bit Stream Bit Rate (bits/s) |
| --- | --- | --- |
| 164 | 8000 | 8200 |
| 176 | 8000 | 8800 |
| 188 | 8000 | 9400 |
| 200 | 8000 | 10000 |
| 212 | 8000 | 10600 |
| 224 | 8000 | 11200 |
| 236 | 8000 | 11800 |
| 248 | 8000 | 12400 |
| 260 | 8000 | 13000 |
| 164 | 11025 | 11301 |
| 176 | 11025 | 12128 |
| 188 | 11025 | 12955 |
| 200 | 11025 | 13782 |
| 212 | 11025 | 14609 |
| 224 | 11025 | 15435 |
| 236 | 11025 | 16262 |
| 248 | 11025 | 17089 |
| 260 | 11025 | 17916 |
| 164 | 22050 | 22602 |
| 176 | 22050 | 24255 |
| 188 | 22050 | 25909 |
| 200 | 22050 | 27563 |
| 212 | 22050 | 29217 |
| 224 | 22050 | 30870 |
| 236 | 22050 | 32524 |
| 248 | 22050 | 34178 |
| 260 | 22050 | 35832 |

This Table 11 can be stored in the audio server and computing units and utilized as a lookup table to select the desired block size and input sampling rate to produce the encoded bit stream bit rate that will optimize to the receiving modem.

As a continuing example, suppose the audio server 24 (FIG. 1) is configured to encode the audio file in real-time as it is transmitted to a recipient computing unit. For this example, the audio server 24 is loaded with codec software and the above lookup table so that it is suitably programmed to perform the steps shown in FIG. 5. For a given effective bit rate of the receiving modem, the audio server 24 will produce the appropriate sized block and use an appropriate input sampling rate to yield an encoded bit stream bit rate that is less than or equal to the receiving modem's effective bit rate, yet greater than the lowest bit rate handled by the RPE encoder 64 (in this case, 8200 samples/second). Recall from the above examples with reference to FIG. 1, the effective bit rates for the receiving modems 37 and 38 were 13.0 kbps and 27.5 kbps, respectively.

Figure 5:
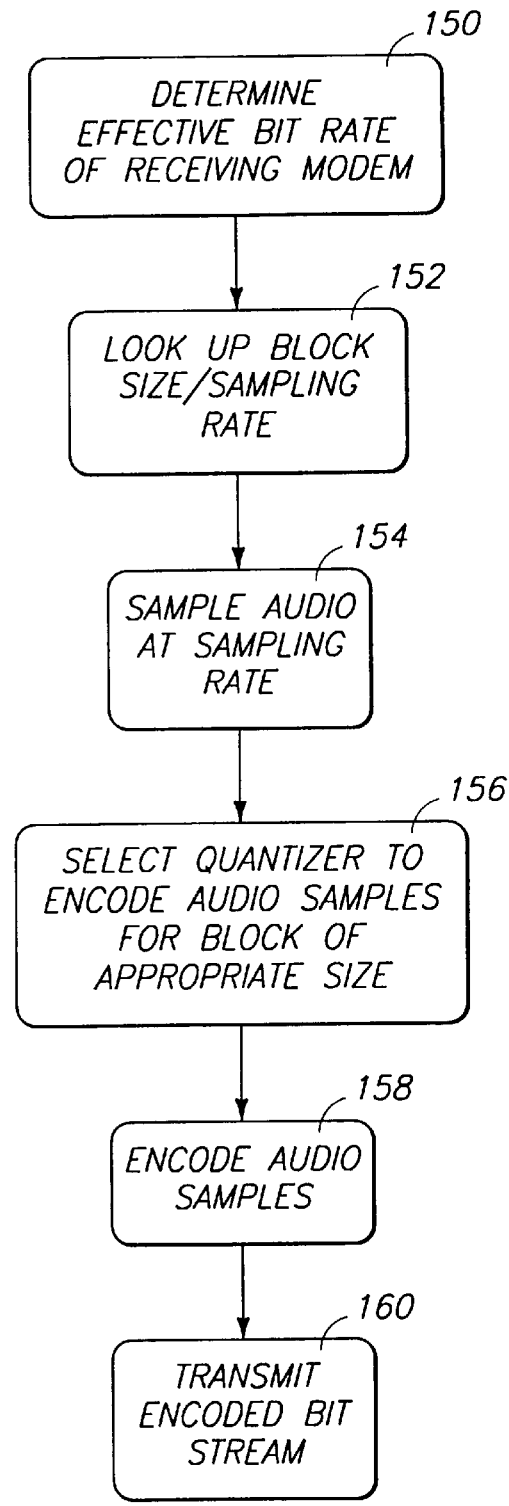
FIG. 5 is a flow diagram of a method for supplying audio files according to another aspect of this invention.

The effective bit rates are communicated to the audio server 24 over network 40 (step 150 in FIG. 5). As above, these effective bit rates can be ascertained by the computing units themselves and sent along with a request for an audio file to the headend. The audio server 24 compares the effective bit rate to the encoded bit stream bit rate in the size/rate lookup Table 11 (step 152 in FIG. 5). For the 13.0 kbps case, the audio server 24 indexes to an entry where the combination of block size and input sampling rate yields a bit stream bit rate of less than 13000 bits/second. From Table 11, one suitable solution would be a block size of 188 bits and a sample rate of 11025 samples/second which produce an encoded bit stream bit rate of 12955 bits/second.

At step 154, the audio server 24 samples the audio file from the audio file storage 26 at the sampling rate of 11025 Hz to produce audio samples (step 154). The codec 50 executing on the audio server 24 then selects a quantizer to encode these audio samples, whereby the selected quantizer produces the number of bits suitable to generate 188-bit audio data blocks (step 156 in FIG. 5). To achieve this task, the RPE coder employs the third quantizer to encode the correct number of sample bits for the 188-bit blocks (step 158). The encoded bit stream is then transmitted from the audio sever 24 to the recipient computing unit 33 (step 160).

As an alternative, any one of the combinations listed above this combination in Table 11 can be used. For instance, a combination of 248 bit blocks containing data sampled at 8000 samples/second could be used to provide an encoded bit stream bit rate of 12400 bits/second. For this alternative combination, the audio server samples the audio file at a sampling rate of 8000 Hz and the RPE coder employs the eighth quantizer to encode the audio samples into a correct number of sample bits for the 248-bit audio data blocks.

In the 27.5 kbps case, the audio server 24 selects from the lookup table any combination of block size and input sampling rate that yields a bit stream bit rate of less than 27500 bits/second. From Table 11, a combination of a block size of 188 bits and a sample rate of 22050 samples/second produces an encoded bit stream bit rate of 25909 bits/second. Alternately, combinations above this entry in the table can be used.

With reference again to FIG. 3, the RPE encoder 64 further has nine inverse quantizers $76_0$–$76_8$ which perform inverse quantization using APCM. The inverse quantizers decode the quantized bits and denormalize the resulting string using the decoded maximum value x'max leading to the decoded sub-sequence x'M(i). The RPE grid positioner 78 then up-samples the decoded sub-sequence x'M(i) by a ratio of three by inserting zero values according to the optimum grid position M to reconstruct forty samples of the long term residual signal e'. The RPE grid positioner 78 outputs the reconstructed long term residual signal e' back to the LTP filter 62.

With reference again to FIG. 2, the RTP-LTP decoder 54 has an RPE decoder 80, a long term predictor filter 82, a short term synthesis filter 84, and a post-processor 86. The RPE decoder 80 decodes and denormalizes the RPE samples using APCM inverse quantization, and then up-samples the decoded sub-sequence to reconstruct forty samples of the long term residual signal e'. The LTP filter 82 produces the reconstructed short term residual signal for the short term synthesis filter 84, which then reproduces 160 samples representative of the original input audio frame. The post-processor 86 is a deemphasis filter which outputs the 160 sample frame.

Figure 4:
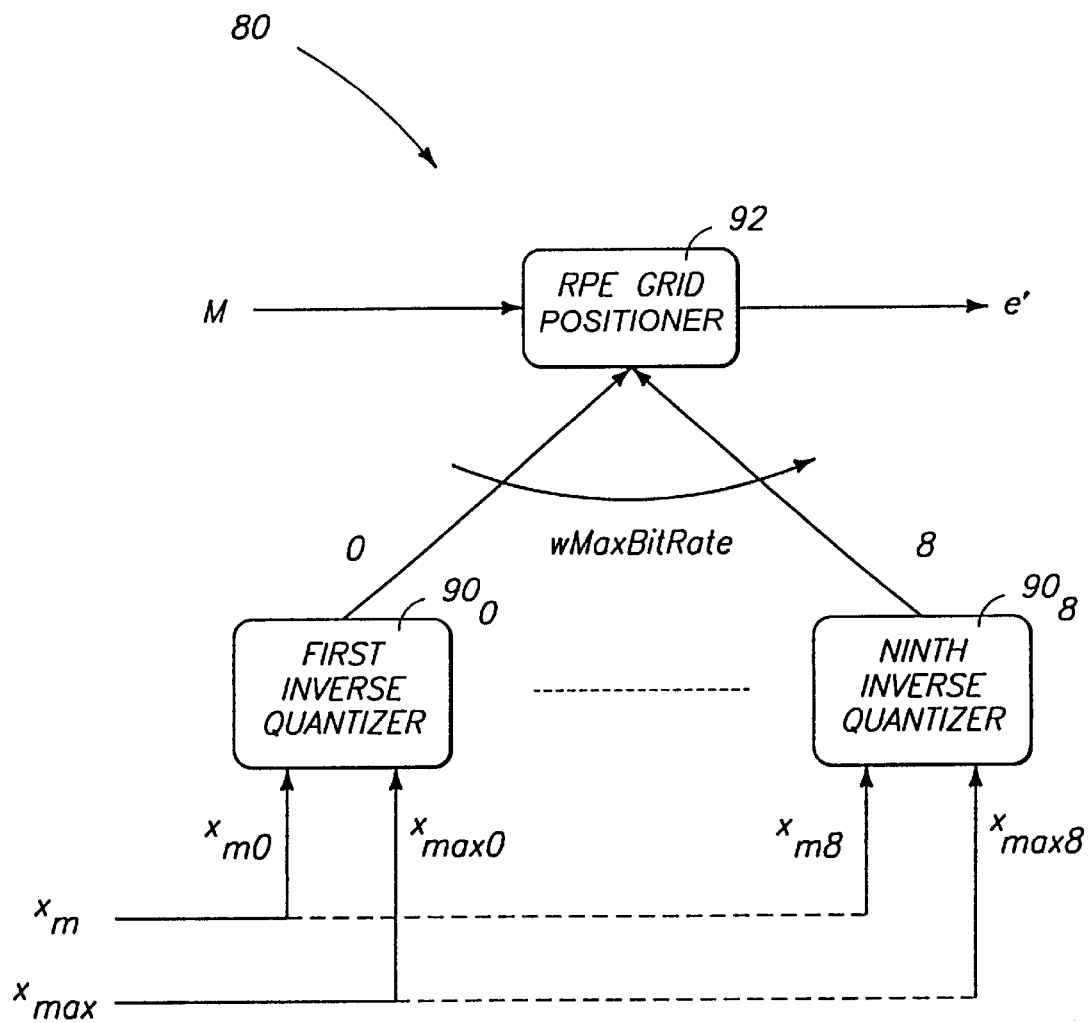
FIG. 4 is a block diagram of an RPE decoder employed in the FIG. 2 codec.

FIG. 4 shows the RPE decoder 80 in more detail. It comprises nine inverse quantizers $90_0$–$90_8$ and an RPE grid positioner 92. The inverse quantizers $90_0$–$90_8$ and RPE grid positioner 92 operate essentially identical to the inverse quantizers $76_0$–$76_8$ and RPE grid positioner 78 employed in the feedback loop portion of the RPE encoder 64 described above with reference to FIG. 3. That is, one of the inverse quantizers $90_0$–$90_8$ decodes the quantized bits and denormalizes the resulting string to produce the decoded sub-sequence $x'_M(i)$. The RPE grid positioner 92 then up-samples the decoded sub-sequence $x'_M(i)$ by a ratio of three by inserting zero values according to the optimum grid position M to reconstruct forty samples of the long term residual signal e'.

Figure 6:
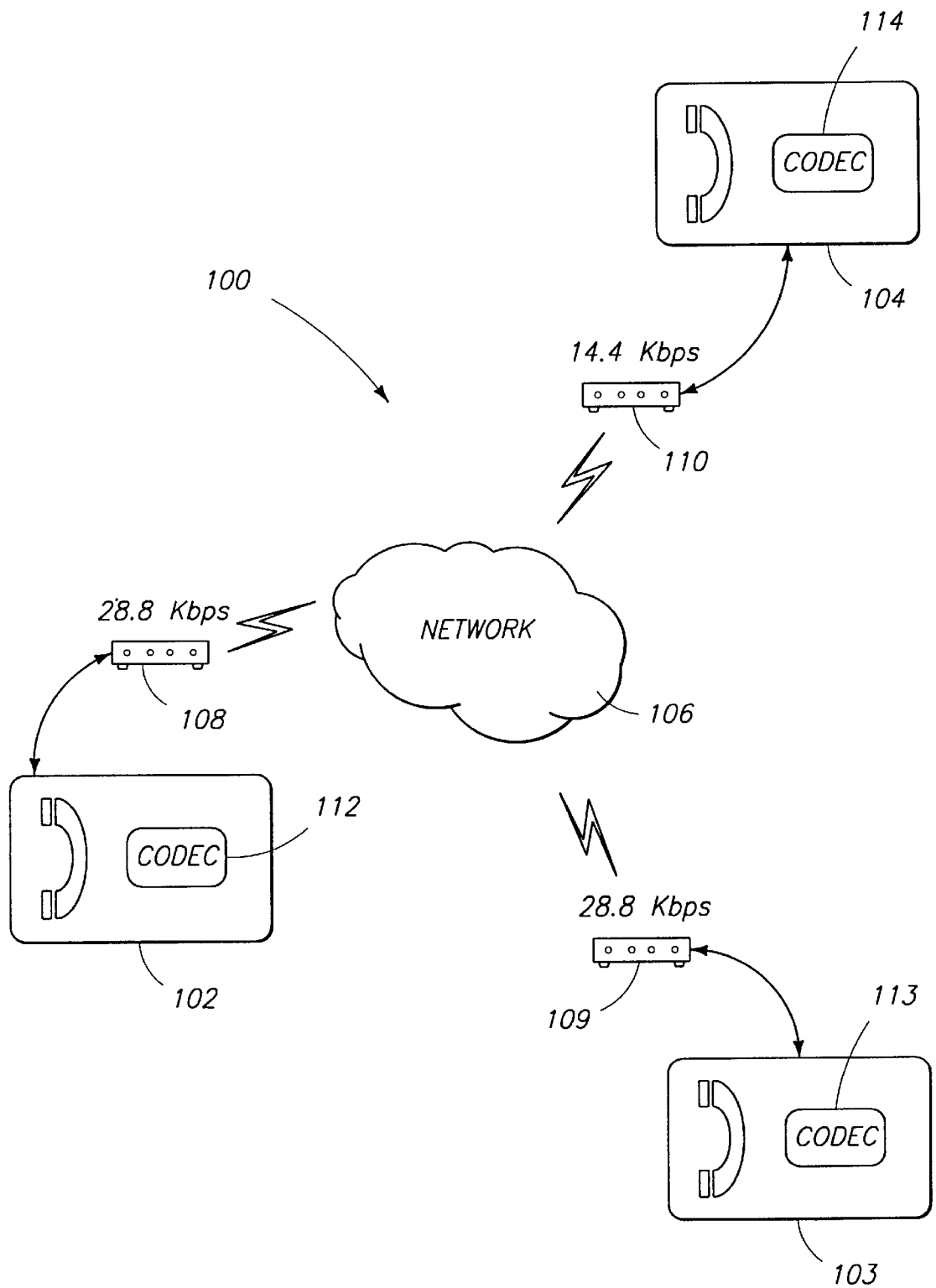
FIG. 6 is a diagrammatic illustration of a communication system according to another aspect of this invention.

FIG. 6 shows a communication system 100 that is implemented using a scaleable codec. Communication system 100 has multiple communication units 102, 103, and 104, interconnected by a network 106. The network 106 can be implemented in different ways, including wireless communication networks (such as a cellular network) and wire-based cable networks (such as a telephone network or computer data network). Each communication unit 102–104 is equipped with a corresponding modem 108, 109, and 110 which operate at a modem rate of 28.8 kbps, 28.8 kbps, and 14.4 kbps, respectively.

Suppose an initiating communication unit 102 desires to call a responding communication unit 104. The initiating communication unit 102 queries its operating system for the present effective bit rate of corresponding modem 108 and sends that information to the responding communication unit 104. The responding communication unit 104 then queries its own operating system for the present effective bit rate of corresponding modem 110 and determines the smallest effective bit rate from between the effective bit rates for the modems of the initiating and responding communication units. The responding communication unit 104 returns the smallest effective bit rate back to the initiating communication unit 102. From that point on, real-time communication between the two communication units is established on the best available bit transmission rate that is less than or equal to the smallest effective bit rate.

Each communication unit 102–104 is equipped with an I/O soundboard (represented by the telephone handset) that permits uni- or bi-directional audio input/output. Each communication unit is further equipped with a scaleable audio codec 112, 113, and 114, respectively, like the one described above with respect to FIGS. 2–4. The audio codecs have multiple quantizers that encode digital data representative of audio sounds into various sized audio data blocks which contain various quantities of bits of sampled audio data. Based upon the discovered least effective bit rate between the communicating pair, the communication units 102 and 104 selects an appropriate sampling rate and data block size that yield the highest quality encoded bit stream bit rate which is still less than or equal to the smallest effective bit rate of the modems. This selection can be facilitated, for example, by the lookup Table 11 stored on each communication unit. The soundboards are operated to sample the voice input at the selected sampling rate to produce voice samples. The codecs 112 and 114 then select the quantizer which produces the appropriately sized audio data blocks which, given the input sampling rate, produce the encoded bit stream bit rate which is less than or equal to the smallest effective bit rate of the two modems. This provides the optimal quality for the communication between the two communication units and efficient utilization of the available bandwidth.

It is noted that the computing units of FIG. 1 and the communication units of FIG. 6 can be configured to query the connection speed of their corresponding modems on routine occasions to continually update that information. If the conditions have improved, whereby a modem connection speed increases, the codec might scale the next series of frames to a higher quality which can now be handled by the modems. This dynamic scaling would ensure that the highest quality signal is always being sent.

The scaleable codec described herein with reference to FIGS. 2–4 offers many benefits, as demonstrated by the audio file distribution system 20 of FIG. 1 and the communication system 100 of FIG. 6. A first benefit is that the scaleable codec facilitates optimal quality audio file streaming. As described in the FIG. 1 implementation, the audio server encodes audio frames from an audio file stored in a database into audio data blocks of a particular size and an input sampling rate that maximize performance of the recipient's modem. The recipient reconstructs the audio frames from the audio data blocks as the blocks are received, and reproduce the audio sound as the audio data is received. Unlike the prior art systems, there is no limitation that the entire file be transmitted at some low quality fixed bit rate before reproduction and play is possible.

A second benefit is that the scaleable codec facilitates optimal quality audio file streaming and mixing of multiple audio files. A third benefit is that the scaleable codec enables real-time communication, such as videoconferencing, teleconferencing, and computer telephony. This benefit is demonstrated in the FIG. 6 implementation, in which two participants exchange audio frames over a communication link in real-time and play each other's frames as they are received.

In compliance with the statute, the invention has been described in language more or less specific as to structure and method features. It is to be understood, however, that the invention is not limited to the specific features described, since the means herein disclosed comprise exemplary forms of putting the invention into effect. The invention is, therefore, claimed in any of its forms or modifications within the proper scope of the appended claims appropriately interpreted in accordance with the doctrine of equivalents and other applicable judicial doctrines.

What is claimed is:

1. A predictive audio coder for encoding digital audio samples representative of an audio signal that has been sampled at an input sampling rate, the predictive audio coder comprising:

a predictor filter to adaptively compute predictive parameters based upon the digital audio samples;

an encoder to encode the digital audio samples into a compressed format for transmission, the encoder comprising:

(a) multiple quantizers for encoding the digital audio samples into various numbers of bits to be contained in audio data blocks so that one quantizer produces a first number of bits for an audio data block of a first size and another quantizer produces a second number of bits for an audio data block of a second size; and (b) a quantizer selector to select one of the multiple quantizers.

2. A predictive audio coder for encoding digital audio samples representative of an audio signal that has been sampled at an input sampling rate, the predictive audio coder comprising:

a predictor filter to adaptively compute predictive parameters based upon the digital audio samples, the predictor filter comprising both long and short term predictive filters;

an encoder to encode the digital audio samples into a compressed format for transmission, the encoder comprising:
(a) multiple quantizers for encoding the digital audio samples into various numbers of bits to be contained in audio data blocks so that one quantizer produces a first number of bits for an audio data block of a first size and another quantizer produces a second number of bits for an audio data block of a second size; and
(b) a quantizer selector to select one of the multiple quantizers.

3. A predictive audio coder for encoding digital audio samples representative of an audio signal that has been sampled at an input sampling rate and further configured to conform to the Group Speciale Mobile (GSM) standard, the predictive audio coder comprising:

a predictor filter to adaptively compute predictive parameters based upon the digital audio samples;

an encoder to encode the digital audio samples into a compressed format for transmission, the encoder comprising:
(a) nine quantizers for encoding the digital audio samples into various numbers of bits to be contained in audio data blocks so that one quantizer produces a first number of bits for an audio data block of a first size and another quantizer produces a second number of bits for an audio data block of a second size; and
(b) a quantizer selector to select one of the nine quantizers.

4. A predictive audio coder as recited in claim 3 wherein:

a first quantizer produces 60 bits for audio data blocks consisting of 164 bits;

a second quantizer produces 72 bits for audio data blocks consisting of 176 bits;

a third quantizer produces 84 bits for audio data blocks consisting of 188 bits;

a fourth quantizer produces 96 bits for audio data blocks consisting of 200 bits;

a fifth quantizer produces 108 bits for audio data blocks consisting of 212 bits;

a sixth quantizer produces 120 bits for audio data blocks consisting of 224 bits;

a seventh quantizer produces 132 bits for audio data blocks consisting of 236 bits;

an eighth quantizer produces 144 bits for audio data blocks consisting of 248 bits; and a ninth quantizer produces 156 bits for audio data blocks consisting of 260 bits.

5. In an audio coder/decoder implemented using regular pulse excitation (RPE), an RPE encoder comprising:

multiple quantizers for encoding digital audio samples sampled at a selected input sampling rate into a compressed format for transmission, the quantizers encoding the audio digital data into audio data blocks containing a defined number of samples with varying numbers of sample bits so that one quantizer produces an audio data block having a first number of sample bits and another quantizer produces an audio data block having a second number of sample bits different than the first number of sample bits; and a quantizer selector to select one of the multiple quantizers.

6. In an audio coder/decoder implemented using regular pulse excitation (RPE) and conforming to the Group Speciale Mobile (GSM) standard, an RPE encoder comprising:

nine quantizers for encoding digital audio samples sampled at a selected input sampling rate into a compressed format for transmission, the quantizers encoding the audio digital data into audio data blocks containing a defined number of samples with varying numbers of sample bits so that one quantizer produces an audio data block having a first number of sample bits and another quantizer produces an audio data block having a second number of sample bits different than the first number of sample bits; and a quantizer selector to select one of the nine quantizers.

7. An RPE encoder as recited in claim 6 wherein:

a first quantizer produces audio data blocks consisting of 164 bits including 60 sample bits;

a second quantizer produces audio data blocks consisting of 176 bits including 72 sample bits;

a third quantizer produces audio data blocks consisting of 188 bits including 84 sample bits;

a fourth quantizer produces audio data blocks consisting of 200 bits including 96 sample bits;

a fifth quantizer produces audio data blocks consisting of 212 bits including 108 sample bits;

a sixth quantizer produces audio data blocks consisting of 224 bits including 120 sample bits;

a seventh quantizer produces audio data blocks consisting of 236 bits including 132 sample bits;

an eighth quantizer produces audio data blocks consisting of 248 bits including 144 sample bits; and a ninth quantizer produces audio data blocks consisting of 260 bits including 156 sample bits.

8. An RPE-LTP coder/decoder implemented using regular pulse excitation (RPE) incorporating an RPE encoder comprising:

multiple quantizers for encoding digital audio samples sampled at a selected input sampling rate into a compressed format for transmission, the quantizers encoding the audio digital data into audio data blocks containing a defined number of samples with varying numbers of sample bits so that one quantizer produces an audio data block having a first number of sample bits and another quantizer produces an audio data block having a second number of sample bits different than the first number of sample bits; and a quantizer selector to select one of the multiple quantizers.

9. In a system for supplying digital audio files to a recipient having a modem to receive digital data at an effective bit rate, the audio files being stored in multiple different versions having audio data blocks of different numbers of data bits taken at different input sampling rates, a program embodied on a compute-readable medium, comprising:

computer-executable instructions to select a version of the audio file that has an appropriate number of data bits and an input sampling rate to produce a bit stream bit rate that is less than or equal to the effective bit rate of the recipient's modem; and computer-executable instructions to supply the selected version of the audio file to the recipient.

10. In a system for supplying digital audio files to a recipient having a modem to receive digital data at an effective bit rate, the audio files being stored in an uncompressed format, a program embodied on a compute-readable medium comprising computer-executable instructions to encode an audio file into individual audio data blocks in real-time wherein each audio data block contains a selected number of bits of digital audio data sampled at a selected input sampling rate, the selected number of bits and the selected input sampling rate determining a bit stream bit rate that is less than or equal to the effective bit rate of the recipient's modem.

11. In a system for supplying digital audio files to a recipient having a modem to receive digital data at an effective bit rate, the audio files being configured into individual audio data blocks wherein each audio data block has a block size, which represents a number bits of digital audio data, and an input sampling rate, which represents the sample rate at which the digital audio data is sampled, a program embodied on a compute-readable medium, comprising:

computer-executable instructions to index a size/rate lookup table listing various combinations of block sizes and sampling rates and select a combination that yields an encoded bit stream bit rate that is less than or equal to the effective bit rate of the recipient's modem; and computer-executable instructions to supply the audio file at the encoded bit stream bit rate.

* * * * *